Figure 1:
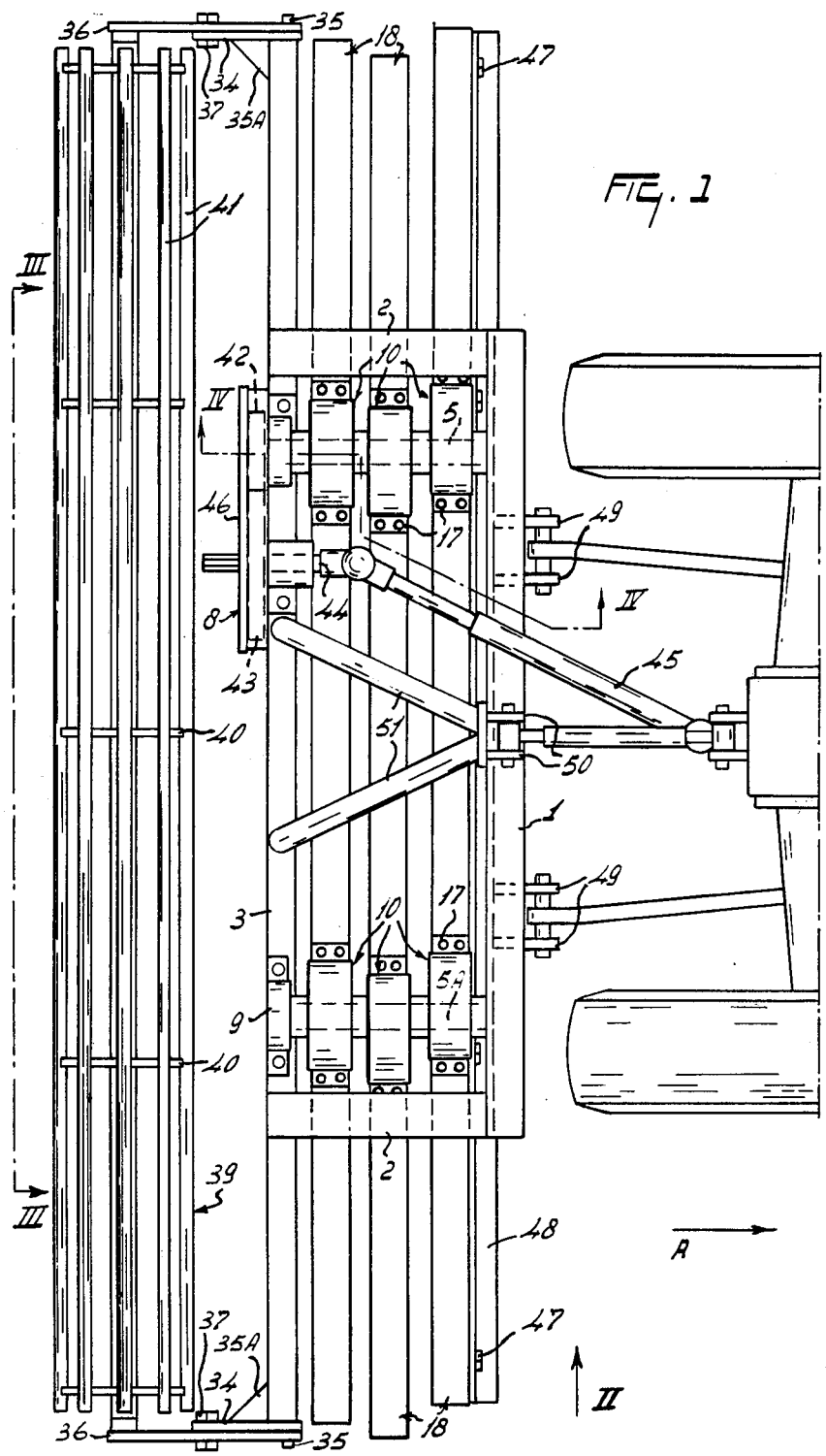

United States Patent [19]

van der Lely

[11] 4,325,435
[45] Apr. 20, 1982

[54] DRIVE TRANSMISSIONS FOR USE IN AGRICULTURAL IMPLEMENTS

[76] Inventor: Cornelis van der Lely, 7, Brüschenrain, Zug, Switzerland

[21] Appl. No.: 52,146

[22] Filed: Jun. 26, 1979

Related U.S. Application Data

[63] Continuation of Ser. No. 841,976, Oct. 13, 1977, abandoned.

[30] Foreign Application Priority Data

Oct. 15, 1976 [NL] Netherlands ......................... 7611396

[51] Int. Cl.³ .............................................. A01B 19/06
[52] U.S. Cl. .................................................. 172/102
[58] Field of Search .............. 172/102, 59, 125, 101, 172/53, 21, 54, 22, 110, 522, 523; 74/47, 15.4; 180/8

[56] References Cited

U.S. PATENT DOCUMENTS

| | | | |
|---|---|---|---|
| 89,361 | 4/1869 | Tounley et al. | 180/8 R X |
| 698,699 | 4/1902 | Gould | 180/8 E |
| 791,884 | 6/1905 | Cyr | 172/102 X |
| 938,839 | 11/1909 | Flynn | 172/110 |
| 3,760,897 | 9/1973 | Reynolds et al. | 180/8 B X |
| 3,821,989 | 7/1974 | Lely et al. | 172/59 |
| 3,841,411 | 10/1974 | Lely et al. | 172/523 X |

FOREIGN PATENT DOCUMENTS

| | | | |
|---|---|---|---|
| 257707 | 3/1927 | Italy | 172/102 |
| 22398 | 2/1930 | Netherlands | 172/102 |
| 127270 | 4/1969 | Netherlands | 172/125 |
| 9240 | of 1915 | United Kingdom | 180/8 R |
| 1074385 | 7/1967 | United Kingdom | 172/102 |

*Primary Examiner*—Paul E. Shapiro
*Attorney, Agent, or Firm*—Mason, Mason and Albright

[57] ABSTRACT

A drive transmission for a soil working implement includes spaced apart elongated tined beams that extend horizontally transverse to the direction of implement travel. The beams are driven to move vertically and horizontally through generally circular paths so that the tines are raised and lowered while moving laterally of the travel direction. A driving shaft and a driven shaft are spaced apart and extend perpendicular to the beams and above same. Each shaft mounts a respective eccentric disc that is fixed to each beam and an imput is connected to rotate the driving shaft which, in turn, rotates the driven shaft via the eccentric discs. The beams are connected to be displaced out-of-phase to mitigate vibration.

6 Claims, 8 Drawing Figures

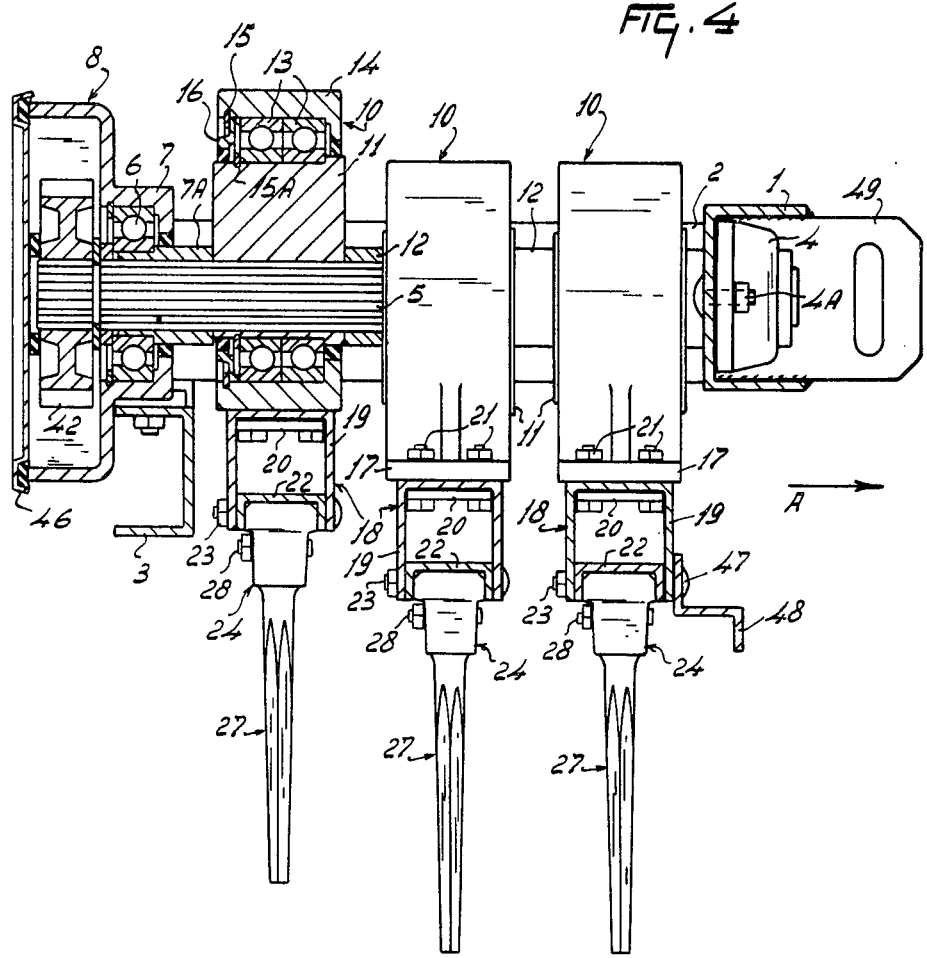

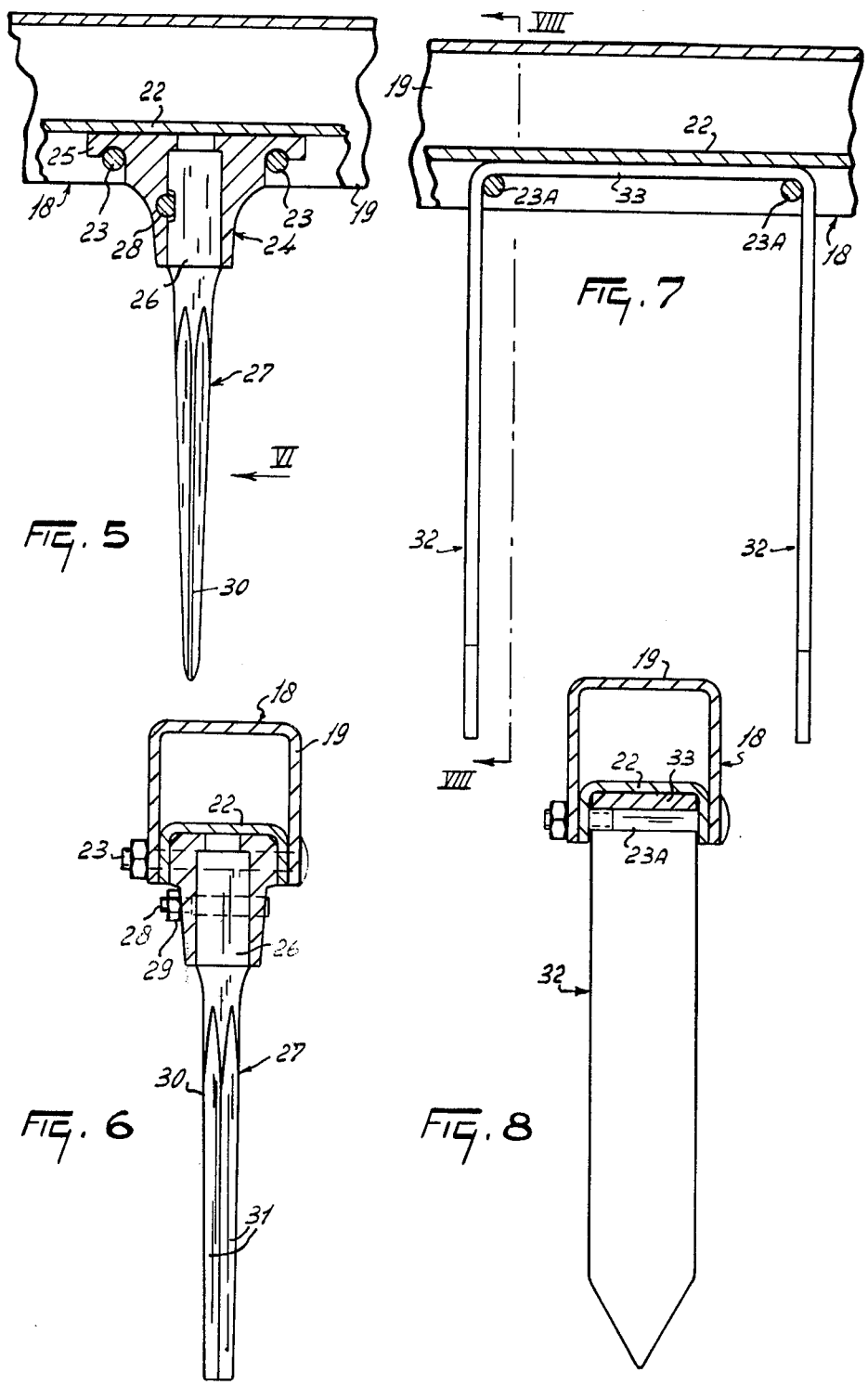

DRIVE TRANSMISSIONS FOR USE IN AGRICULTURAL IMPLEMENTS

This is a continuation of Ser. No. 841,976 filed Oct. 13, 1977 now abandoned.

According to the invention, there is provided a drive transmission for use in an agricultural implement, wherein the transmission comprise three beams, each beam being provided with ground-contact members of the implement, and wherein said beams are coupled to at least one of at least two eccentric mechanisms that are spaced from one another with one of them disposed on a driving shaft and the other on a driven shaft of the transmission.

Figure 2:
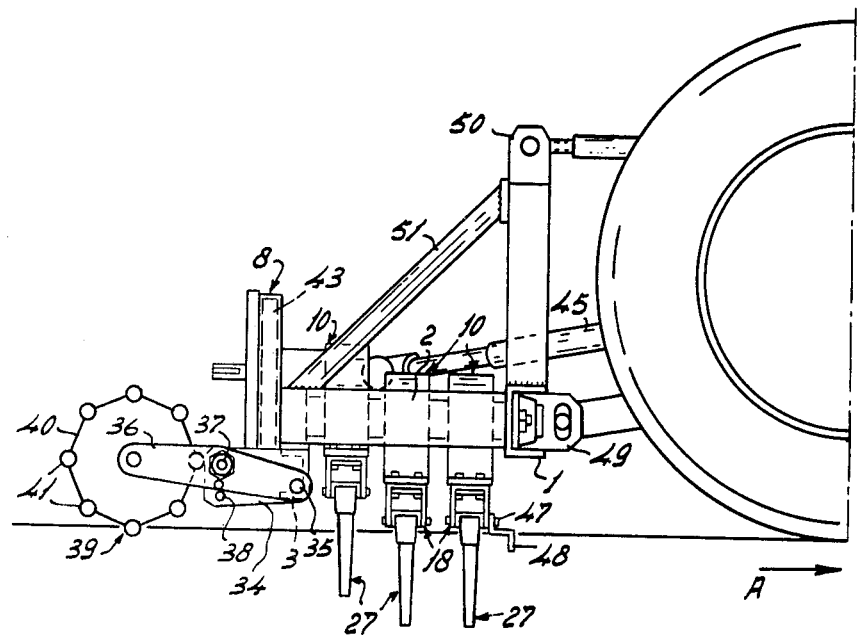
Figure 3:
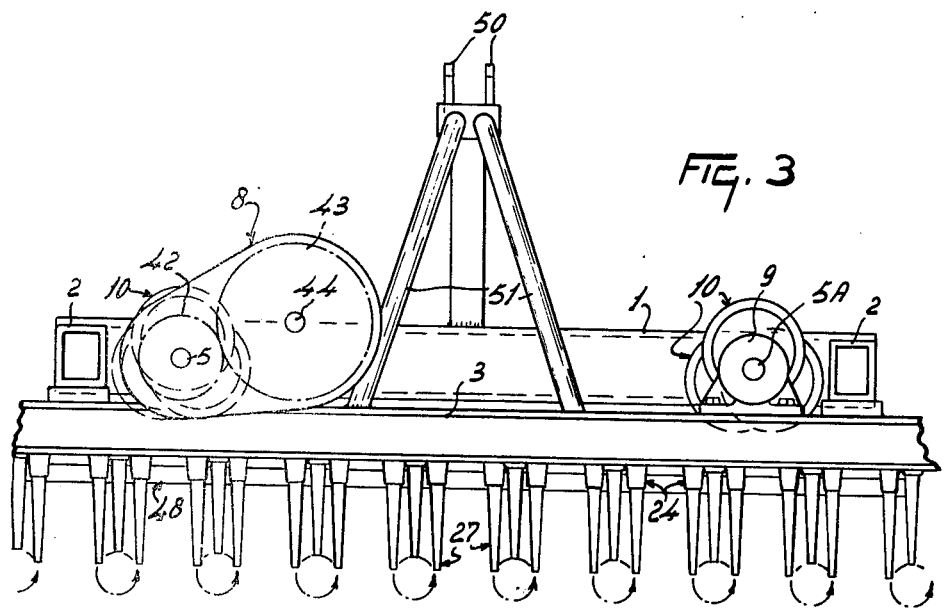

For a better understanding of the invention, and to show how the same may be carried into effect, reference will now be made, by way of example, to the accompanying drawings, in which:

FIG. 1 is a plan view of an agricultural implement or machine in the form of a soil cultivating implement or machine in accordance with the invention connected to the rear of an agricultural tractor, FIG. 2 is a side elevation as seen in the direction indicated by an arrow II in FIG. 1, FIG. 3 is a rear view as seen in the direction indicated by arrows III—III in FIG. 1, a rear part of the implement or machine being omitted in this Figure, FIG. 4 is a section, to an enlarged scale, taken on the line IV—IV in FIG. 1, FIG. 5 is a part-sectional elevation, to an enlarged scale, illustrating the construction and mounting of one tine of the implement or machine in greater detail, FIG. 6 is an elevation as seen in the direction indicated by an arrow VI in FIG. 5, FIG. 7 is similar to FIG. 5 but illustrates a form of ground-contact member that is an alternative to the tine of FIG. 5, and FIG. 8 is a section taken on the line VIII—VIII in FIG. 7.

Referring to FIGS. 1 to 6 of the accompanying drawings, the soil cultivating implement or machine that is illustrated therein as one example of an agricultural implement to which the present invention can be applied comprises a frame beam 1 that extends substantially horizontally transverse, and usually (as illustrated substantially horizontally perpendicular, to the intended direction of operative travel of the implement which is indicated in several Figures of the drawings by an arrow A. The beam 1 is of channel-shaped cross-section and is so disposed (see FIG. 2) that its web or base is contained in a substantially vertical plane with its two limbs projecting horizontally or substantially horizontally forwardly therefrom in parallel relationship with one another and parallel or substantially parallel relationship with the direction A. The opposite ends of the frame beam 1 are bolted, welded or otherwise rigidly secured to the leading ends of two substantially horizontal frame beams 2 that extend parallel to one another and parallel or substantially parallel to the direction A, each of the two frame beams 2 being of hollow formation and polygonal cross-section, the oblong cross-section that is illustrated (FIG. 3) being preferred but other polygonal cross-sections, such as square, being equally suitable. The rearmost ends of the two beams 2 with respect to the direction A are rigidly interconnected, at the bottoms thereof, by a frame beam 3 that extends substantially horizontally parallel to the frame beam 1 and thus substantially perpendicular, or at least transverse, to the direction A, said frame beam 3 being of considerably greater length than the frame beam 1 so that opposite end regions thereof project laterally well beyond the corresponding frame beams 2. It will be seen from FIG. 2 of the drawings that the frame beam 3, like the frame beam 1, is of channel-shaped cross-section and is disposed with its substantially vertically orientated web or base foremost with respect to the direction A, the upper and lower limbs of the beam thus projecting substantially horizontally rearwardly from said web or base with respect to the direction A with the upper limb indirectly secured by bolts (see FIG. 4) to the bottoms of the two frame beams 2. The two end regions or portions of the frame beam 3 that project laterally beyond the corresponding beams 2 each have a length which is not less than substantially equal to one-third of the length of the frame beam 1.

The upright web or base of the frame beam 1 is formed at two locations which are spaced inwardly towards the midpoint of the beam by equal distances from the two frame beams 2 with two holes whose centers are midway between the upper and lower edges of said web of base. Each hole receives a part of a corresponding bearing housing 4, said housing: having flanges that are secured to the web or base of the beam 1 by bolts 4A (FIG. 4). The leading ends of two parallel and substantially horizontally disposed shafts 5 and 5A are rotatably receive in the ball or roller bearings (not illustrated) which are accommodated in the two bearing housings 4. The two shafts 5 and 5A are parallel to one another and parallel or substantially parallel to the direction A and each of them has a diameter of substantially 5 centimeters. When the implement is viewed from the rear in the direction A, the left-hand shaft 5 (FIG. 4) has a region close to its rearmost end surrounded by a stepped sleeve 7A. The smaller diameter step of the sleeve 7A is surrounded by the inner race of a ball bearing 6 and the outer race of that ball bearing 6 is lodged inside a housing 7 that forms an integral part of a gear box or casing 8, the latter being rigidly but releasably secured to the upper limb of the rear frame beam 3 by bolts. The other shaft 5A is a little shorter in axial length than the shaft 5 and its rear end, with respect to the direction A, is rotatably received in a ball or roller bearing (not visible) mounted in a housing 9 that is rigidly but releasably secured to the upper limb of the rear frame beam 3 by bolts.

Each of the two shafts 5 and 5A is provided at regularly spaced apart intervals along its length with a plurality (in this case, three) of corresponding eccentric mechanisms 10. The shafts 5 and 5A are formed with splines throughout at least the greater parts of their lengths and each mechanism 10 comprises a corresponding eccentrically bored disc or bush 11, the eccentric bore therein being internally splined to enable the disc or bush 11 concerned to be movable axially along its shaft 5 or 5A without being turnable angularly around the longitudinal axis thereof to any significant extent. The regular spacing between the three mechanisms 10 along each of the two shafts 5 and 5A is provided by furnishing substantially identical internally splined spacer sleeves 12 between the discs or bushes 11 of the respective mechanisms 10. The internally splined sleeve 7A that surrounds the shaft 5 acts to maintain the rearmost one of the corresponding mechanisms 10 with respect to the direction A in its correctly spaced relationship with the housing 7 of the gear box or casing 8.

The leading mechanisms 10 with respect to the direction A are maintained in their appointed positions axially along the shafts 5 and 5A by co-operation of their discs or bushes 11 with rear parts of the corresponding bearing housings 4. The outer cylindrically curved surface of each eccentrically bored disc or bush 11 is surrounded by the inner races of two adjoining ball bearings 13. The adjoining ball bearings 13 are prevented from becoming axially displaced relative to the disc or bush 11 of their eccentric mechanism 10 by co-operating with a larger diameter step in the outer cylindrically curved surface of said disc or bush 11 and with a circlip 15A whose inner edge is received in a groove in the cylindrically curved surface concerned. The outer races of each pair of ball bearings 13 constitute a support for a corresponding surrounding ring 14. Each ring 14 is retained against axial displacement relative to the corresponding ball bearings 13 by being formed with an internal shoulder towards one end thereof and by the provision of a circlip 15 towards the opposite end thereof, said circlip 15 having its outer edge received in an internal groove of the ring 14 concerned and said circlip 15 also being arranged to maintain part of a combined clamping member and lubricant seal 16 in position between that circlip 15 and the corresponding circlip 15A. In the embodiment which is being described, the sizes of the discs of bushes 11 of the three mechanisms 10 which correspond to each of the two shafts 5 and 5A are such that the longitudinal axis of each basically cylindrical disc or bush 11 is spaced from the longitudinal axis of the eccentric bore that is formed therethrough by a distance of substantially 4 centimeters. Moreover, viewed lengthwise of each of the two shafts 5 and 5A, the true longitudinal axes of the three basically cylindrical discs or bushes 11 that correspond thereto are spaced apart from one another at substantially 120° intervals around the longitudinal axis of the shaft 5 or 5A concerned and the coincident longitudinal axes of the eccentric bores in the three respective discs or bushes 11.

The outer surface of each ring 14 is provided, at the bottom of that ring as seen in FIG. 4 of the drawings, with a pair of substantially tangentially disposed lugs 17 and those lugs are rigidly but releasably secured to a corresponding one of three beams 18 by bolts 21 and a corresponding clamping plate 20. The three beams 18 extend substantially horizontally parallel to the beams 1 and 3 and each of them couples together the rings 14 of a corresponding pair of the eccentric mechanisms 10, one of those two mechanisms 10 corresponding to the shaft 5 and the other thereof corresponding to the shaft 5A. Owing to the eccentric positions of the rings 14 around the shafts 5 and 5A, the three beams 18, which are of equal length, are offset axially relative to one another to a small extent (see FIG. 1). Each beam 18 is of inverted channel-shaped cross-section, that is to say, the substantially horizontally disposed web or base thereof that is secured to the corresponding lugs 17 by the clamping plates 20 and bolts 21 is uppermost whereas substantially vertically disposed limbs 19 thereof project downwardly from said web or base in parallel relationship with one another. Lower free end regions of the two limbs 19 of each beam 18 have a similarly disposed beam 22 of much shallower channel-shaped cross-section arranged between them, the downwardly directed limbs of each beam 22 being secured to the downwardly directed limbs 19 of the corresponding embracing beam 18 by a plurality of substantially horizontally disposed and spaced apart bolts 23. In the embodiment which is being described, the limbs of each shallow channel-shaped cross-section beam 22 project from the web or base thereof by a distance which is substantially one-fifth of the distance by which the limbs 19 of each beam 18 project downwardly away from the web or base of that beam 18. The lowermost edges of the two limbs 19 of each beam 18 and the lowermost edges of the limbs of the corresponding shallower beam 22 are at the same horizontal level and a plurality of holders 24 are arranged between the limbs of each beam 22 at substantially regularly spaced apart intervals along the length of that beam 22, said intervals conveniently having magnitudes of substantially 20 centimeters. Each holder 24 is maintained in its appointed position principally by co-operation with a corresponding pair of the bolts 23 and it will be seen from FIG. 5 of the drawings that each holder 24 has an upper fastening portion 25 which exhibits a flat surface that bears against the downwardly facing flat surface of the web or base of the beam 22 concerned between the limbs of that beam. The downwardly directed surfaces of each fastening portion 25 is formed with two partially cylindrically curved recesses which recesses co-operate with the corresponding pair of bolts 23 in retaining the holder 24 concerned in its appointed position.

Each holder 24 projects substantially perpendicularly downwards from its fastening portion 25 and comprises a first portion which is of reduced size as compared with the fastening portion 25 and a second downwardly tapering but substantially cylindrical sleeve-like portion. All three of the portions of each holder 24 are formed with a substantially vertically extending opening which has a polygonal cross-section, a square cross-section being preferred. As can be seen in FIG. 5 of the drawings, an upper end region of each opening is of reduced size, said region substantially coinciding with the fastening portion 25 of the holder 24 concerned. A shoulder is thus formed between the region of each opening that is of reduced size and the remainder of that opening and the upper end of a fastening portion 26 of a ground-contact member abuts against said shoulder. In this embodiment, the ground-contact member is in the form of a rigid soil working tine 27.

The fastening portion 26 of each tine 27 is of square or other polygonal cross-section to match the shape of the opening in the co-operating holder 24 and it will be seen from FIGS. 5 and 6 of the drawings that one side of each tine fastening portion 26 is formed, at a level substantially midway between the upper and lower ends of said portion 26, with a substantially horizontally extending recess that is a shallow U-shaped or channel-shaped cross-section. A transverse bore is formed through the material of each holder 24 at a position which will register with the recess in the fastening portion 26 of the corresponding tine 27 when that tine is installed in its appointed position and a cotter pin 28 that is formed with an oblique wedging surface is entered through the bore in each holder 24 in such a way that said wedging surface co-operates with the upright base of the shallow U-shaped or channel-shaped recess in the corresponding tine fastening portion 26. One end of each cotter pin 28 is formed, beyond the wedging surface thereof, with a screw-thread and, when the cotter pin 28 is arranged in its fastening position, the screwthreaded portion projects from the end of the bore in the holder 24 concerned and is arranged to co-operate with a retaining nut 29 that can be tightened to prevent the cotter pin 28 from working loose. The lower end of the fastening portion 26 of each tine 27 is integrally connected to a soil working portion 30 of that tine, the longitudinal axis of said soil working portion 30 being coincident with the longitudinal axis of the fastening portion 26. The soil working portion 30 of each tine 27 is basically of substantially rhombic cross-section and tapers downwardly towards its lowermost free end or tip as seen in front or rear elevation (FIG. 5) whereas there is no significant downward taper as seen in side elevation (FIG. 6). Thus, the width of each soil working portion 30 near the lowermost free end or tip thereof as seen in the side view of FIG. 6 of the drawings is not less than substantially three times the width of the same portion 30 at the same point as seen in front or rear elevation (FIG. 5).

The two corners of the substantially rhombic cross-section that are farthest apart from one another are formed as ribs which ribs are at the front and rear of the soil working portion 30 of each tine 27 with respect to the direction A. The other two corners of each soil working portion 30 are rounded off to some extent and four hollow grooves or recesses 31 are formed in the four what would otherwise be flat sides of each soil working portion 30 so as to extend upwardly from the free end or tip thereof throughout most of the length of said portion 30. As can be seen in the drawings, the grooves or recesses 31 have widths which are substantially equal to the widths of the respective four sides of each soil working portion 30. The uppermost ends of the grooves or recesses 31 become rapidly shallower and said grooves or recesses thus terminate at levels which are short distances beneath the junctions between the soil working portions 30 and fastening portions 26 of the tines 27.

As previously mentioned, the tines 27 are so disposed that the longer diagonals of the substantially rhombic cross-section of their soil working portions 30 extend parallel or substantially parallel to the direction A. It will also be remembered that the tines 27 are spaced apart from one another at regular distances along the corresponding beams 18/22 and the arrangement is, in fact, such that, when tines 27 that correspond to all three of the beams 18/22 are projected onto a vertical plane by viewing the implement from the rear in the direction A (i.e. FIG. 3), said tines are disposed in groups of three with the respective groups spaced apart from one another in a horizontal direction that is perpendicular to the direction A. Instead of employing the tines 27 that have been described with reference to FIGS. 1 to 6 of the drawings, alternative ground-contact members in the form of resilient strip-shaped tines 32 (FIGS. 7 and 8) may be used. The tines 32 are, once again, connected to the beams 18 and 22, said tines 32 being formed in integral pairs from, for example, spring steel strip, their upper ends being integrally interconnected by a perpendicular, and usually substantially horizontally disposed, portion 33. The connecting portion 33 lies between the downwardly directed limbs of the corresponding shallow channel-shaped beam 22 with its upper surface in abutting engagement with the lower surface of the web or base of that beam 22. Two bolts 23A perpendicularly interconnect the limbs of the corresponding beams 18 and 22 at locations which coincide with the angular junctions between the upper ends of the two tines 32 of each pair and the corresponding connecting portion 33 and it will be seen from FIGS. 7 and 8 of the drawings that this arrangement reliably maintains each pair of tines 32 in its appointed position. The bolts 23A are identical to the bolts 23 except that at least some of them occupy different positions lengthwise along the beams 18 and 22 as compared with the bolts 23. The pairs of tines 32 are, in fact, so dimensioned and positioned relative to one another that the individual tines are spaced apart from one another along the composite beams 18/22 by distance which advantageously have magnitudes of substantially 20 centimeters, the general plane of each spring steel or to other strip-shaped tine 32 being parallel or substantially parallel to the direction A. It can be seen from FIG. 8 of the drawings that the lowermost end of each tine 32 is formed as a substantially V-shaped tip.

The opposite ends of the rear frame beam 3 of the implement have substantially vertical plates 34 rigidly secured to them, said plates 34 being parallel to one another and substantially parallel to the direction A with both of them projecting rearwardly from said frame beam 3 with respect to the direction A. The rigid perpendicular connection between each plate 34 and the corresponding end of the frame beam 3 is strengthened by the provision of a substantially triangular plate 35A. The leading ends of the two plates 34 with respect to the direction A carry corresponding pivot pins 35 that are substantially horizontally aligned in a direction that is perpendicular or substantially perpendicular to the direction A and arms 36 are turnable upwardly and downwardly alongside the respective pivot pins 35 alongside the corresponding plate 34. The arms 36 thus extend generally rearwardly from the pivot pins 35 with respect to the direction A and each arm 36 is formed at a distance from the corresponding pivot pin 35 with at least one hole which hole can be brought into register with any chosen one of a number of holes 38 that are formed near the rearmost edge of the adjoining plate 34 at equal distances from the pivot pin 35 concerned. Bolts 37 are provided for entry through the holes, or chosen holes, in the arms 36 and through chosen ones of the holes 38 in the corresponding plates 34 and it will be appreciated that the holes which are chosen for co-operation with the bolts 37 determine the angular positions of the arms 36 about the substantially horizontal axis that is defined by the pivot pins 35. Once the bolts 37 are tightened, the chosen angular positions are rigidly maintained in a very reliable manner. The rearmost ends of the two arms 36 carry substantially horizontally bearings which stub shafts at the opposite ends of a combined rotatable supporting member and soil crumbling member of the implement in the form of a roller 39 are rotatably received. The roller 39 is mounted in a freely rotatable manner and comprises a central axially extending, and preferably tubular, carrier to which a plurality, such as five, of substantially vertical support plates 40 are secured at regularly space apart intervals with two of said plates 40 located close to the opposite ends of the carrier. In the embodiment which is being described, the support plates 40 are of generally octagonal configuration (FIG. 2) and corresponding corners thereof are rigidly interconnected by eight crumbling bars 41 that extend parallel to the axis of rotation of the roller 39 at regular 45° intervals around that axis. It is not, of course, essential that there should be eight of the crumbling bars 41 and, although it is preferred that they should extend parallel to the axis of rotation of the roller 39, it is possible to use a construction in which they are would helically around that axis to some extent.

The rear end, with respect to the direction A, of the shaft 5 that projects into the gear box or casing 8 is provided, inside that casing, with a straight-toothed or spur-toothed pinion 42 whose teeth are drivingly in mesh with those of a larger but otherwise similar pinion 43. The pinion 43 is secured to a substantially horizontal rotary driving shaft 44 that is parallel or substantially parallel to the shaft 5 and to the direction A. Bearings mounted on top of the frame beam 3 rotatably support the shaft 44 and its leading end that projects forwardly from said bearings is connected, during the use of the implement, by a universal joint to one end of a telescopic transmission shaft 45 which is of a construction that is known per se. The leading end of the telescopic transmission shaft 45 is connected by a further universal joint to the rear power take-off shaft of an agricultural tractor or other vehicle which is to move and operate the implement during the use of the latter. The rear of the gearbox or casing 8 is sealingly closed by a releasable cover 46 and it will be seen from FIGS. 1 and 2 of the drawings that the rearmost end of the shaft 44 projects through a hole in the cover 46 from the back of the gearbox or casing 8. This rearmost end is splined or otherwise keyed and can be employed in transmitting drive to the moving parts of a further implement, machine or tool that may be used in conjunction with the soil cultivating implement or machine that is being described. It is noted that the speed of rotation of the shaft 5 can be changed, without altering the input speed of rotation that is applied to the leading end of the shaft 44, by removing the cover 46 and substituting a different pair of co-operating pinions for the pinions 42 and 43, the substitute pinions being of different sizes to the pinions 42 and 43. In this connection, it will be seen from FIGS. 3 and 4 of the drawings that the portion of the gear box or casing 8 in which the pinion 42 is disposed is large enough to hold an alternative pinion of significantly greater diameter without difficulty. The leading one of the three beams 18 with respect to the direction A has a soil levelling member in the form of a shaped plate 48 (FIGS. 1, 2 and 4) releasably secured to it by bolts 47. The shaped plate 48 has a substantially horizontal portion and a downwardly directed portion and acts to level the surface of the soil that is about to be engaged by the tines 27 or 32. Two pairs of lugs 49 are rigidly secured to the frame beam 1 so as to project forwardly therefrom with respect to the direction A at two locations which are spaced from the midpoint of the beam 1 by equal distances. A support extends upwardly from the midpoint of the beam 1 and carries a pair of forwardly projecting coupling lugs 50 at its uppermost end. The upper end of the support which has just been mentioned is also connected to two horizontally spaced apart locations at the top of the rear frame beam 3 by a pair of downwardly and rearwardly convergent tie beams 51. As is illustrated somewhat diagrammatically in FIGS. 1 and 2 of the drawings, the lugs 49 are arranged to co-operate with the free ends of the lower lifting links of a three-point lifting device or hitch at the rear of an agricultural tractor or other operating vehicle with the aid of horizontal pivots whereas the upper coupling lugs 50 are arranged to co-operate by way of a pivot with the rear end of the upper adjustable length lifting link of the same three-point lifting device or hitch.

In the use of the soil cultivating implement or machine that has been described, its frame is connected to the three-point lifting device or hitch at the rear of an agricultural tractor or other operating vehicle by way of the coupling lugs 49 and 50. The known telescopic transmission shaft 45 which has universal joints at its opposite ends is employed to place the rear power take-off shaft of the same tractor or other operating vehicle in driving connection with the leading end of the shaft 44. The transmission within the gear-box or casing 8 is a speed-increasing step-up transmission but, before work commences, the magnitude of that speed increase will be adjusted, if required, by employing the illustrated pinions 42 and 43 or, as mentioned above, an alternative pair of co-operating pinions. The maximum depth to which the tines 27 or 32 can penetrate into the soil when the implement is in use can also be adjusted, before work commences, by temporarily removing the bolts 37 and turning the arms 36. With the roller 39, upwardly or downwardly, as may be required, about the axis defined by the pivot pins 35. Once a new setting has been produced, it is reliably maintained by replacing and tightening the bolts 37, the axis of rotation of the roller 39 then being fixed in level relative to the level of the frame of the implement. As the implement moves operatively in the direction A over land that is to be cultivated, the shaft 5 is revolved, at a higher speed than the shaft 44, and the rings 14 of the eccentric mechanisms 10 move orbitally and rotationally around the shaft 5 and, similarly, around the shaft 5A, the latter shaft being driven from the shaft 5 by the movements of the composite beams 18/22 and the mechanisms 10. The drive transmission to the ground-contact members of the implement which, in this embodiment, are in the form of either the tines 27 or the alternative tines 32, is such that the tips of those tines 27 or 32 and any point on one of the tines or one of the beams 18/22, performs a continuous circular motion as illustrated in FIG. 3 of the drawings, the diameter of the circular path of movement having, with the construction that has been described, a magnitude of substantially 7 centimeters. The distance, in the direction A, between neighbouring pairs of the beams 18 is greater than the width of one of those beams measured in the same direction. It will, of course, be realised that the discs or bushes 11 that correspond in position along the two shafts 5 and 5A are mounted in identical angular settings around the longitudinal axes of those shafts. With the drive transmission to the tines 27 or 32 or other ground-contact members that has been described, the three consecutive (in the direction A) composite beams 18/22 are each coupled to one driving, and one driven, eccentric mechanism 10 and, owing to the angular spacings of those members 10 around the respective shafts 5 and 5A by angles of substantially 120°, there is very little, if any, jerkiness or jolting in the operation of the implement. It is thus possible, by employing appropriate speed-increasing pinions in the gear-box or casing 8, to cause the beams 18/22 and their tines 27 or 32 or other ground-contact members to move through the circular paths (FIG. 3) that have been referred to above at speeds which may be as high as 1,000 revolutions per minute whereby the tines 27 or other ground-contact members can produce a very intensive crumbling of the soil, the area of the soil through which the crumbling action is effective being enlarged by the high speed of rotation.

In addition to its supporting function which has been described above, the roller 39 produces still further crumbling of the soil and, in particular, will crush any insufficiently crumbled lump of soil that may exceptionally have been left upon the surface of the ground by the foregoing tines or other ground-contact members. The roller 39 governs the maximum depth to which the tines or other ground-contact members can penetrate into the soil and has a final levelling or smoothing effect upon the broad strip of ground that is worked by the implement. The leading soil levelling member that is afforded by the shaped plate 48 extends throughout the length of the leading beam 18 and is effective in ensuring that the soil which will immediately subsequently be contacted by the tines 27 or 32 has a substantially smooth or at least level surface. The separate holders 24 for the tines 27 enable those tines to be easily and reliably mounted in, or removed from, their appointed positions. A badly worn or damaged tine 27 can readily be released from its holder 24 merely by undoing the retaining nut 29 and withdrawing the corresponding cotter pin 28. The new tine 27 is quickly replaced in its holder 24 employing, if necessary, a fresh cotter pin 28, the latter being of a simple and inexpensive construction. The use of the spring steel or other resilient tines 32 in substitution for the tines 27 is particularly but not exclusively, desirable for dealing with land that is heavily infested with weeds since the tines 32 cut up and tear out a very high proportion of the weeds thus greatly reducing the infestation as well as preparing the land for the subsequent growing of crops. The resilient tines 32 also operate advantageously on heavy soils since the irregular vibratory movements which the perform during working will usually provide a more intensive crumbling of such soil than when rigid tines, such as the tines 27, are employed. It is emphasised that ground contact members other than the tines 27 or 32 can be employed in implements in accordance with the invention.

Although various features of the soil cultivating agricultural implement embodiments that have been described and/or that are illustrated in the accompanying drawings will be set forth in the following claims as inventive features, it is emphasised that the invention is not necessarily limited to such features and that it includes within its scope each of the parts of each soil cultivating agricultural implement embodiment that has been described, and/or that is illustrated in the accompanying drawings, both individually and in various combinations.

What we claim is:

1. A drive transmission for an agricultural implement comprising a frame and a plurality of elongated transverse composite beams supported on said frame and tine means depending from each of said beams, driving means, including a rotary driving shaft and a rotatable driven shaft, connected to each of said beams through respective eccentric mechanisms, each mechanism including an eccenter disc and a bearing, the eccenter discs being mounted along the lengths of the two shafts and said bearings surrounding said eccenter discs, said mechanisms being connected to corresponding beams through said bearings and said driving shaft being positioned for engagement by an input, said driving shaft and its respective eccentric mechanisms being connected to rotate said driven shaft through said beams and the eccentric mechanisms mounted along the length of said driven shaft, said two shafts being spaced apart and extending transverse to said beams, the opposite ends of said shafts being supported by transverse frame members that extend substantially parallel to one another, said members being interconnected to each other by further frame members that extend generally in the direction of implement travel and said further frame members being located laterally of the outer sides of said shafts, said composite beams being positioned below and within an enclosed portion of the frame formed by said frame members and further frame members, each beam comprising two separate beam members of channel-shaped cross-section with limbs, one of said beam members being nested inside the other, the limbs of said beam members projecting downwardly from their bases.

2. A drive transmission as claimed in claim 1, wherein each inner beam member mounts tines and said tines are spaced apart from one another and mounted along the length of each of the inner beam members by holders which retain the tines in their appointed positions, each holder being positioned between the limbs of the inner beam member.

3. A drive transmission as claimed in claim 2, wherein said holder cooperates with retaining fastenings which secure the limbs of the inner and outer beam members.

4. A drive transmission as claimed in claim 1, wherein an inner beam member of each composite beam has limbs whose lengths are about one-third the lengths of the limbs of an outer beam member.

5. A drive transmission as claimed in claim 1, wherein each eccentric mechanism comprises an eccentrically bored bush and the true longitudinal axes of said three mechanisms on each shaft are angularly spaced apart from one another by about 120° around the axis of said shaft and the coincident longitudinal axes of the bores in said bushes.

6. A drive transmission as claimed in claim 1, wherein there are at least three composite beams and said beams extend substantially parallel to one another, said beams being spaced from one another, as seen in plan view, by a distance less than the width of one of said beams as measured in the same direction.

* * * * *